Feb. 18, 1936.   N. C. VANDER KRAATS   2,031,394
PLANT MARKER
Filed March 7, 1935
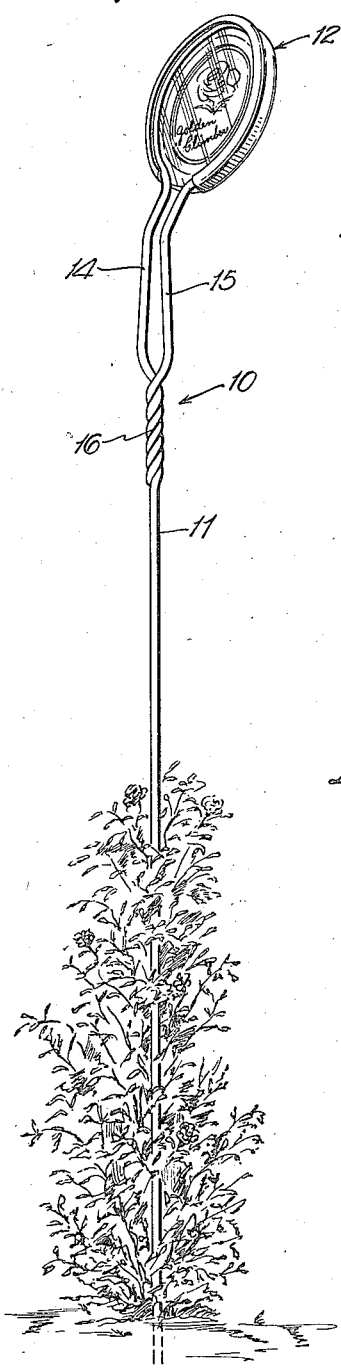
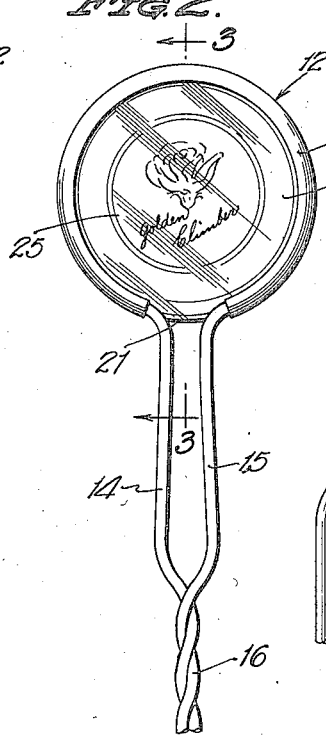
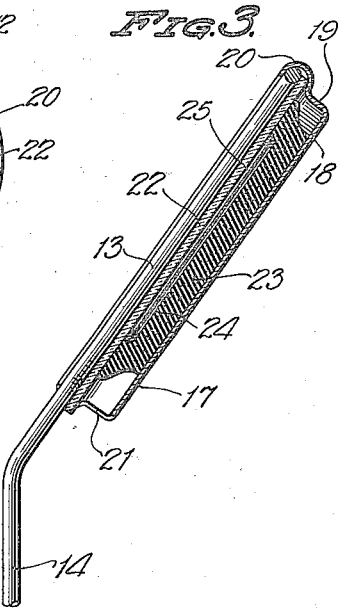
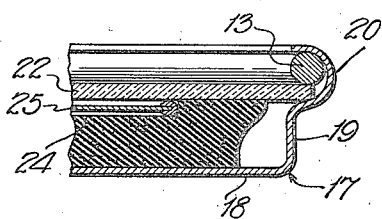
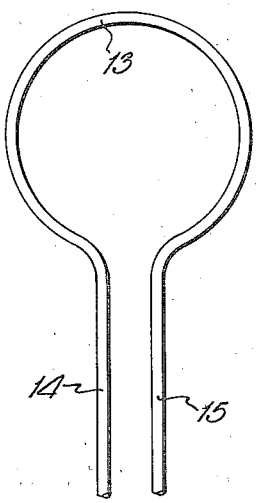
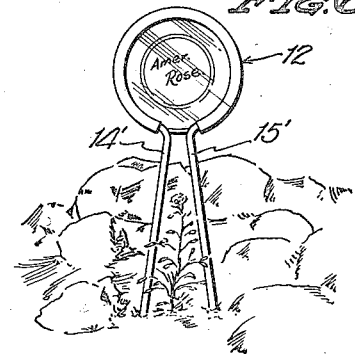
INVENTOR.
NICHOLAS C. VANDER KRAATS.
BY
ATTORNEYS.

Patented Feb. 18, 1936

2,031,394

UNITED STATES PATENT OFFICE 2,031,394

PLANT MARKER

Nicholas C. Vander Kraats, New Brunswick, N. J.

Application March 7, 1935, Serial No. 9,719

4 Claims. (Cl. 40—10)

This invention relates to improvements in identification markers and has particular reference to a plant marker for insertion into the ground adjacent a plant for identifying its variety or specie.

One of the main objects of the invention resides in a plant marker which facilitates the inter-changing of identification cards to enable repeated use of the device in association with different varieties of plants, and which preserves the identification card against the elements by reason of its waterproof qualities.

Another feature of the invention is the provision of a waterproof plant marker in which the name of the variety of a plant with which it is used may be clearly displayed for reading without necessitating stooping or bending on the part of an interested party.

A further object of the invention is to provide a plant marker embodying an elongated stem having a flat water tight head at the top end thereof within which the name of a plant may be displayed, the display head being tilted backward at an angle to shed rain water therefrom as well as display the name of the plant in a manner to be visible to a person standing thereover.

A still further object of the invention is to provide a water proof plant marker which is simple and inexpensive of construction, and which lends attractiveness to a garden in which the same may be used for identifying the variety of plants growing therein.

With these and other objects in view, the invention resides in the certain novel construction, combination and arrangement of parts, the essential features of which are hereinafter fully described, are particularly pointed out in the appended claims, and are illustrated in the accompanying drawing, in which:

Figure 1 is a perspective view of the improved plant marker in use for identifying the variety of a growing plant.

Figure 2 is a fragmentary front elevational view of the head end of the marker.

Figure 3 is a vertical sectional view on the line 3—3 of Figure 2.

Figure 4 is a detail enlarged horizontal sectional view through the water tight display head.

Figure 5 is a fragmentary elevational view of the head end of the stem.

Figure 6 is a front elevational view of a modified form of marker for use in association with rock garden plants.

Referring to the drawing by reference characters, the numeral 10 designates my improved plant marker in its entirety which includes broadly, an elongated stem 11 adapted to have one end inserted into the ground, while a display head 12 is removably supported by the opposite end of the stem. The detail construction and assembly of these parts will now be explained.

The stem 11 shown in Figures 1 to 5 inclusive is constructed of a single length of stiff bendable resilient wire, one end of which is bent into the form of a spring loop or split ring 13, the terminal end of the bent portion of the wire being extended downwardly to provide a leg 14 which is substantially parallel to an offset bent portion forming a leg 15. The extreme end of the bent end of the wire stem is twisted about the stem as at 16. After the clamping loop 13 and legs 14 and 15 are formed, the looped end is bent at an angle as clearly shown in Figure 3 of the drawing and for a purpose to be presently explained. By reason of the spaced parallel relation of the legs 14 and 15, the clamping loop or ring 13 may be contracted and by reason of its resilient nature, will automatically expand upon release of pressure upon the legs.

The display head 12 comprises a relatively flat casing 17 which is of angular formation and includes a flat back wall 18, and an annular side wall 19, the peripheral edge of the side wall being formed in the shape of a rim or rounded bead 20, the bead or rim being split as at 21, the split extending inwardly through the side wall 19 to the rear wall 17 and which split portion constitutes the bottom end of the casing. Seated against the inner side of the rim 20 is a transparent glass panel or window 22, the same serving to close the casing while secured to the inner side of the glass panel by vacuum, is a disk like suction cup 23, the front of which is formed with a recess 24 whereas the rear is substantially flat for abutting engagement with the flat rear wall 18 of the casing. Seated within the recess 23 is a tag or label 25 on which may be printed or written the name of a plant with which the device is to be associated. It is of course understood that prior to the insertion of the glass panel 22 and suction cup 23 into the casing, that identification card or label is first seated in the recess 24 and the suction cup applied to the inner side of the glass panel 22 so as to be held in position thereon by vacuum, and which vacuum is maintained by reason of the pressure applied to the suction cup by reason of its pressing engagement with the rear wall 18 of the casing.

For the purpose of securing the glass window and suction cup in position within the casing, the split ring or loop 13 is compressed and inserted within the open side of the casing in such compressed condition, the legs 14 and 15 extending through the split portion of the rim 20 and upon release of the resilient ring 13, the same will expand and become seated within the rim or rounded edge 20, thus bearing against the glass panel 22 and serving to compress the rubber suction cup 23 against the rear wall 18 of the casing.

The construction just described provides a water tight enclosure for the tag or label 25 to prevent water entering the casing and effecting a deterioration of the label. When the plant marker is in use as shown in Figure 1, the lower end of the stem 11 is inserted into the ground adjacent a plant to be identified and when thus inserted, the head end of the article is clearly visible for reading by a person standing above and at the front of the marker due to the fact that the head end is tilted rearwardly. Any rain water falling upon the glass front of the head will drain off through the split portion 21, thus preventing the accumulation of water upon the head or within the casing 17. Due to the vacuum seal between the suction cup and the glass panel, water is excluded from entering the recess 25 in which the identification tag or label is seated.

In the event that it should be desired to remove an identification tag or label 25 for the substitution of a different tag or label, it is only necessary for the user to compress the legs 14 and 15, thus disconnecting the stem 11 from the head 12, the cut away portion 21 serving to permit the fingers of the user to reach the glass panel 22 and remove the panel and suction cup as a unit. By breaking the suction between the suction cup and the glass, the two parts may be separated and the tag or label removed.

In Figure 6 of the drawing, I have shown a slightly modified form of stem, the other parts being the same as that hereinbefore described. This form of marker is intended to be used in connection with the flowers planted in rock gardens and embodies a pair of downwardly and outwardly diverging legs 14' and 15'. These legs are relatively short compared with the length of the stem 11 as in the use mentioned it is desired that the display head be nearer the ground due to the fact that the plants are of short height.

Although I have shown and described the invention for use as a plant marker, it will be understood that the construction may be embodied for other uses where a waterproof identification or display may be used.

While I have shown and described what I consider to be the preferred embodiments of my invention, it will be understood that various changes may be resorted to as come within the scope of the appended claims.

Having thus described the invention, what I claim as new and desire to secure by Letters Patent of the United States, is:—

1. A plant marker comprising a casing open at its front, a transparent window closing the open front of said casing, a recessed suction member held by a vacuum to the inside of said transparent window, the recess in said suction member adapted to receive a plant identification label for display through said transparent window, a resilient stem, and separable interengaging means between the top end of said stem and said casing for retaining said transparent window and suction member within said casing and for facilitating separation of these parts to enable interchanging of a plant identification label within the recessed suction member.

2. A plant marker comprising a casing open at its front, a transparent window closing the open front of said casing, a recessed suction member held by a vacuum to the inside of said transparent window, the recess in said suction member adapted to receive a plant identification label for display through said transparent window, a resilient stem, and separable interengaging means between the top end of said stem and said casing for retaining said transparent window and suction member within said casing and for facilitating separation of these parts to enable interchanging of a plant identification label within the recessed suction member, said interengaging means including a rim provided on the side walls of said casing, and a resilient loop formed at the top of said stem and seated in said rim.

3. In a waterproof identification marker, a casing open at its front, a transparent window closing the open front of said casing, a suction cup member secured by vacuum to the inside of said transparent window and adapted to have an identification label interposed therebetween, said suction cup member abutting the rear wall of said casing, a rim formed on the side walls of said casing beyond the plane of said transparent window, and a resilient split ring like clamp seated in said rim for securing said window and suction cup member in assembled position within said casing.

4. In a waterproof identification marker, a casing open at its front, a rim formed on the side walls of said casing, a transparent window panel seated against and within said rim, a suction cup member secured by vacuum to the inside of said window panel and adapted to have an identification label interposed therebetween, a rigid stem, and a resilient split clamp carried by said stem and seated in said rim in abutting engagement with said window panel.

NICHOLAS C. VANDER KRAATS.